United States Patent
Sircar (10) Patent No.: US 12,184,691 B2
(45) Date of Patent: Dec. 31, 2024

(54) IDENTIFYING A PHISHING ATTEMPT

(71) Applicant: BlackBerry Limited, Waterloo (CA)

(72) Inventor: Shiladitya Sircar, Ottawa (CA)

(73) Assignee: BlackBerry Limited, Waterloo (CA)

( * ) Notice: Subject to any disclaimer, the term of this patent is extended or adjusted under 35 U.S.C. 154(b) by 337 days.

(21) Appl. No.: 17/546,946

(22) Filed: Dec. 9, 2021

(65) Prior Publication Data

US 2023/0188563 A1  Jun. 15, 2023

(51) Int. Cl.
*H04L 9/40* (2022.01)

(52) U.S. Cl.
CPC ...... *H04L 63/1483* (2013.01); *H04L 63/0236* (2013.01); *H04L 63/1425* (2013.01)

(58) Field of Classification Search
CPC ............. H04L 63/1483; H04L 63/0236; H04L 63/1425; H04L 63/1466; G06F 21/552; G06F 21/6245
USPC .......................................................... 726/1
See application file for complete search history.

(56) References Cited

U.S. PATENT DOCUMENTS

| | | | |
|---|---|---|---|
| 8,307,431 B2 | 11/2012 | Krishnamurthy et al. | |
| 8,977,747 B2 | 3/2015 | Tonnesen | |
| 9,521,161 B2 * | 12/2016 | Reumann | H04L 63/1441 |
| 9,830,360 B1 | 11/2017 | Mokani et al. | |
| 10,313,352 B2 * | 6/2019 | Kuo | H04L 63/1483 |
| 10,601,865 B1 * | 3/2020 | Mesdaq | H04L 63/1425 |
| 10,862,907 B1 * | 12/2020 | Pon | G06F 16/955 |
| 11,336,689 B1 * | 5/2022 | Miramirkhani | H04L 63/0281 |
| 2006/0080735 A1 * | 4/2006 | Brinson | H04L 63/1483 726/22 |
| 2008/0046738 A1 * | 2/2008 | Galloway | H04L 63/1416 713/176 |

(Continued)

FOREIGN PATENT DOCUMENTS

| | | |
|---|---|---|
| CN | 106060038 | 10/2016 |
| EP | 3599753 | 1/2020 |

OTHER PUBLICATIONS

Domcop.com [online], "Buy Expired Domains With Great Backlinks" Feb. 2004, [retrieved on Dec. 9, 2021], retrieved from : URL <https://www.domcop.com/>, 8 pages.

(Continued)

*Primary Examiner* — Tauqir Hussain
(74) *Attorney, Agent, or Firm* — Fish & Richardson P.C.

(57) ABSTRACT

Systems, methods, and software can be used to determine a classification of a network accessible page, for example a web page on Internet. In some aspects, a method comprises receiving, at a gateway, a request for accessing a network accessible page from an end-user device; processing the network accessible page to generate a first embedding that characterizes network attributes of a domain of the network accessible page, and a second embedding that characterizes content attributes of the network accessible page; generating, from the first embedding, a first score that characterizes a predicted similarity between the network accessible page and one or more known network accessible pages; generating, from the second embedding, a second score that characterizes a predicted likelihood that the network accessible page is asking for sensitive information; and using at least the first score and the second score to determine a classification of the network accessible page.

21 Claims, 4 Drawing Sheets

(56) References Cited

U.S. PATENT DOCUMENTS

| | | | | |
|---|---|---|---|---|
| 2008/0162449 A1* | 7/2008 | Chao-Yu | ............... | G06F 16/248 |
| | | | | 707/999.005 |
| 2008/0172741 A1* | 7/2008 | Reumann | ............ | H04L 63/1483 |
| | | | | 707/999.005 |
| 2009/0094677 A1* | 4/2009 | Pietraszek | ............... | H04L 61/00 |
| | | | | 726/2 |
| 2012/0230582 A1* | 9/2012 | Iofis | ........................ | G06V 10/56 |
| | | | | 382/165 |
| 2013/0086677 A1* | 4/2013 | Ma | ........................ | H04L 63/1483 |
| | | | | 726/22 |
| 2013/0263272 A1* | 10/2013 | Banerjee | ............. | H04L 63/1483 |
| | | | | 726/25 |
| 2014/0359760 A1 | 12/2014 | Gupta et al. | | |
| 2015/0067839 A1* | 3/2015 | Wardman | ............... | G06Q 10/10 |
| | | | | 726/22 |
| 2017/0180378 A1* | 6/2017 | Tyler | ................... | H04L 63/1433 |
| 2018/0115565 A1* | 4/2018 | Kuo | .................... | H04L 63/1483 |
| 2020/0036751 A1* | 1/2020 | Kohavi | ............... | H04L 63/1416 |
| 2020/0228500 A1 | 7/2020 | Olumofin | | |

OTHER PUBLICATIONS

Majestic.com [online], "Find Out Who Links to Your Website" May 2001, [retrieved on Dec. 9, 2021], retrieved from : URL <https://majestic.com/reports/majestic-million>, 5 pages.

Extended European Search Report in European Appln. No. 22212209.5, dated Apr. 12, 2023, 10 pages.

\* cited by examiner

IDENTIFYING A PHISHING ATTEMPT

TECHNICAL FIELD

This disclosure relates generally to the computer security field, and more particular, to identifying phishing web pages and hindering associated activity.

BACKGROUND

"Phishing" refers to attempting to fraudulently acquire sensitive information, such as passwords and credit card details, by spoofing web pages of legitimate organizations. Phishing usually involves reproducing in "look and feel" a legitimate web page—such as that of a bank—on a server under the control of an attacker. The victim enters personal information on the web page, believing the web page to be trusted, and that information is harvested by the attacker for fraudulent use.

DESCRIPTION OF DRAWINGS

Like reference numbers and designations in the various drawings indicate like elements.

DETAILED DESCRIPTION

Techniques described herein provide a method to determine a classification of a network accessible page (e.g., a web page or a website), a domain of the network accessible page, or both. In some examples, the techniques can be used to identify phishing web pages, including zero-day phishing web pages. Instead of relying solely on monitoring and attempting to decrypt secure network traffic such as traffic encrypted using Hypertext Transfer Protocol Secure (HTTPS) or Transport Layer Security (TLS) protocols to discover phishing attacks or phishing domains, techniques described herein can make this determination based on any combination of a variety of available information including one or more of various network, domain, or page content properties of the network accessible page. In this way, a fast and accurate classification can be made even in the cases where the full uniform resource locator ("URL") of the network accessible page is not available.

Specifically, the method involves determining a measure of similarity between a network accessible page and one or more known network accessible pages and generates a first score that characterizes a predicted similarity between the network accessible page and the one or more known network accessible pages. For example, the one or more known network accessible pages can be web pages obtained from a list of the most popular domains (e.g., commercially available/open source publicly available lists of domain names, such as the list provided by Majestic Million available at https://majestic.com/reports/majestic-million or DomCop available at https://www.domcop.com/, or other available top/popular domain listings), a configurable list of domain names for a given entity/customer, for a given vertical (e.g., government entities, bank/financial entities, medical/hospital entities, retail entities, technology entities, or other vertical markets/channels), for entities in a given geographical area, and/or any combination thereof.

The method also involves using natural language processing (NLP) techniques to analyze and detect any type of information the network accessible page is asking for and generates a second score that characterizes a predicted likelihood that the network accessible page is asking for sensitive information. In some examples, this can be done by rending the content in the backend by actively probing the network accessible page and navigating through any links contained therein.

Optionally, the method further involves determining a measure of visual similarity between the network accessible page and one or more known network accessible pages that ask for sensitive information, and generates a third score that characterizes a predicted visual similarity between the network accessible page and the one or more known network accessible pages that ask for sensitive information. For example, the one or more known network accessible pages that ask for sensitive information can be a subset of login pages or other data gathering pages obtained from the list of the one or more known network accessible pages discussed above.

A classification of the network accessible page can then be determined by using the first score, the second score and, optionally, the third score. In some examples, if no match with any known, reputed network accessible pages is found (e.g., the first score does not satisfy a similarity threshold), and yet the network accessible page is harvesting login credentials such as usernames or passwords or other personal identifiable information such as social security numbers or credit card numbers (e.g., the second score satisfies a sensitivity threshold), appropriate precautionary measures may be taken to reduce risk and improve information security. For example, access to the network accessible page by a user computing device may be temporarily blocked. As another example, an IT operation staff may be notified for further analysis of the network accessible page.

In some implementations, the techniques described herein may be implemented at a network gateway device (referred to below as a "gateway"), which can be a data processing apparatus responsible for routing data communication traffic between an internal network and an external network, such as Internet. For example, the gateway can be a wireless router, a wireless access point, a modem cum router, a set-top box, a zero trust network access point, or any computing device that can provide access to the external network. The gateway may monitor the network traffic using the described techniques and take appropriate measures in the case where a client computing device on the internal network is requesting for access to a network accessible page on the external network that has been classified as a phishing or a suspicious page.

In some implementations, the techniques described herein may be implemented on a server, which in turn may be implemented on one or more computers in one or more locations and is generally coupled in data communication with the Internet. The server may monitor the Internet for any newly created network accessible page and use the described techniques to actively probe the network accessible page to make a classification determination of the network accessible page. FIGS. 1-4 and associated descriptions provide additional details of these implementations.

Techniques described herein produce one or more technical effects. The described techniques allow for fast and accurate determination of a classification of a network accessible page, from which appropriate precautionary measures may be taken to reduce risk and improve information security. In some cases, a gateway utilizing the described techniques can automatically perform risk assessment of a network accessible page in near real-time during network traffic observation, even if the gateway does not have access to the full uniform resource locator (URL) of the network accessible page. By combining various network, domain, page content properties, and possibly other available information about the network accessible page in making the classification determination, the applicable use cases of the described techniques may extend into those where conventional solutions such as a static block list would fail, including defending against zero-day phishing threat, a threat caused by phishing web pages with extremely short lifecycles.

Figure 1:
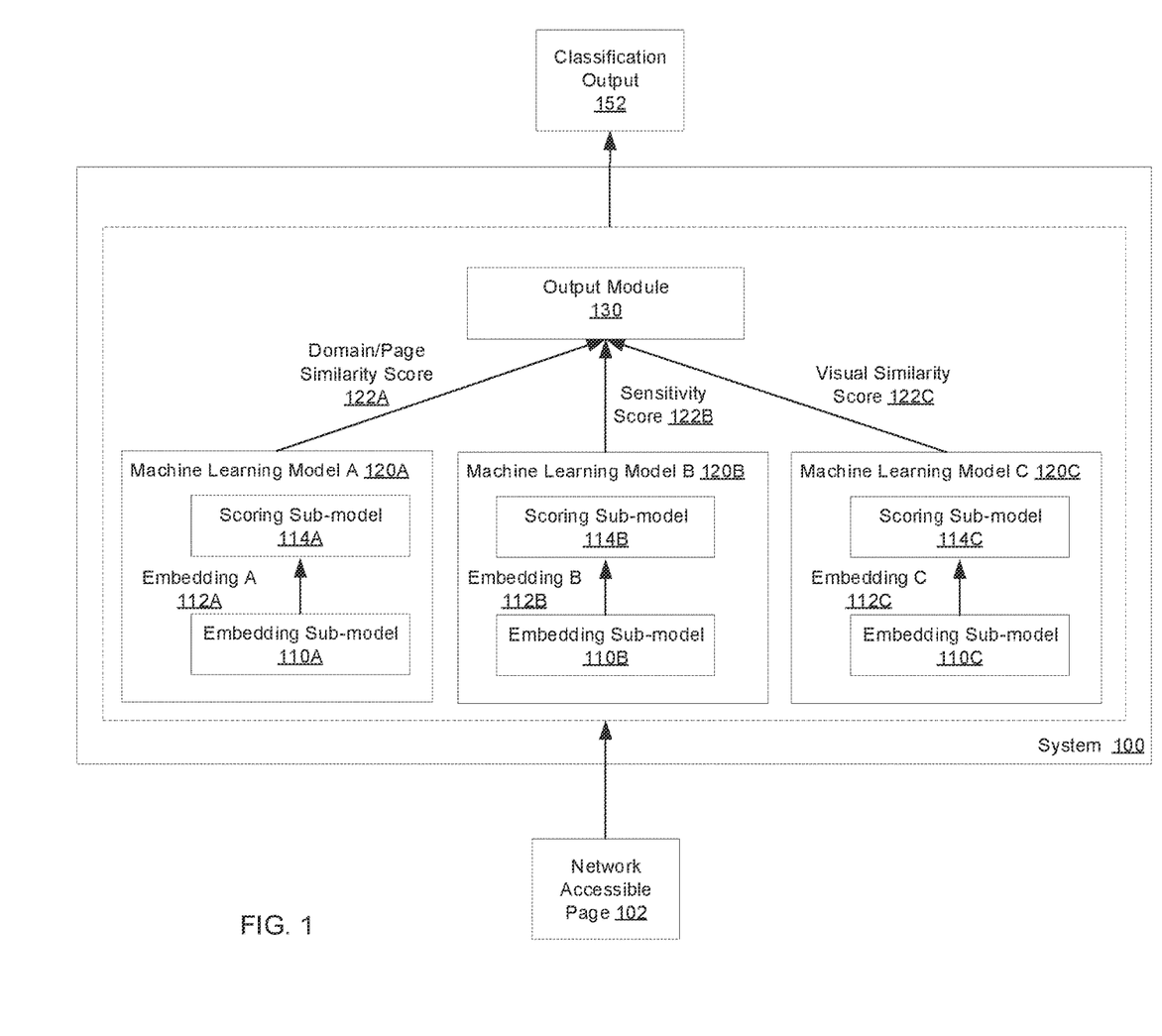
FIG. 1 is a schematic diagram showing an example system that generates a classification determination of a network accessible page, according to an implementation.

FIG. 1 is a schematic diagram showing an example system 100 that generates a classification determination of a network accessible page, according to an implementation. The system 100 is an example of a system implemented as computer programs on one or more computers in one or more locations, in which the systems, components, and techniques described below can be implemented.

The system 100 can receive as input a network accessible page 102, data that identifies a network accessible page 102 (e.g., a domain name, including a fully qualified domain name (FQDN), or a uniform resource locator (URL) of the network accessible page), or both and to process the input using the components of the system 100 to generate an output 152 that specifies a classification of the network accessible page 102. Additionally or alternatively, the output 152 can specify a classification of the domain name of the network accessible page 102.

The difference between a URL and a fully qualified domain name is illustrated below:

URL: "https://www.blackberry.com/us/en"

Fully Qualified Domain Name: "www.blackberry.com"

The URL is simply a formatted string made up of a domain name (here it's "blackberry"), a domain category (".com"), and sometimes other elements like a subdomain ("www.") and path ("/us/en"), while "www.blackberry.com" is the fully qualified domain name.

The system 100 includes a plurality of machine learning models 120A-C that are each configured to process the input, data derived from the input, or both to generate a respective embedding, e.g., embedding 122A, of the network accessible page 102 from which a corresponding score, e.g., score 122A, can be determined. The system also includes an output module 130 that is configured to generate the output classification 152 from the respective scores 122A-C. As used herein, an embedding is an ordered collection of numeric values, e.g., a matrix or vector of floating point or quantized values.

Each machine learning model can in turn include one or more sub-models. For example, as illustrated in the FIG. 1, the first machine learning model 120A can include an embedding sub-model 110A and a scoring sub-model 114A.

At a high level, the system 100 uses each embedding sub-model, e.g., embedding sub-model 110A, to process the input, data derived (e.g., extracted) from the input, or both to generate a respective embedding, e.g., embedding 112A, of the network accessible page 102. Each respective embedding characterizes the features, attributes, properties, or a combination thereof in one or more different aspects of the network accessible page 102.

The system 100 then uses each scoring sub-model, e.g., scoring sub-model 114A, to process a respective embedding, e.g., embedding 112A, to generate a corresponding score for the embedding, e.g., score 122A. For example, the score can be any value between 0 and 1 (e.g., inclusive on both ends).

In some implementations, the first score 122A is a score (referred to as "domain/page similarity score") that characterizes a predicted similarity between the network accessible page and one or more known network accessible pages. The second score 122B is a score (referred to as "sensitivity score") that characterizes a predicted likelihood that the network accessible page is asking for sensitive information. The third score 122C is a score (referred to as "visual similarity score") that characterizes a predicted similarity between the network accessible page and one or more known network accessible pages that ask for sensitive information.

For example, the one or more known network accessible pages can be web pages obtained from a list of the most popular domains (e.g., commercially available/open source publicly available lists of domain names, such as the list provided by Majestic Million available at https://majestic.com/reports/majestic-million or DomCop available at https://www.domcop.com/, or other available top/popular domain listings), a configurable list of domain names for a given entity/customer, for a given vertical (e.g., government entities, bank/financial entities, medical/hospital entities, retail entities, technology entities, or other vertical markets/channels), for entities in a given geographical area, and/or any combination thereof. Similarly, the one or more known network accessible pages that ask for sensitive information can be a subset of login pages or other data gathering pages obtained from the list of the one or more known network accessible pages.

Each sub-model can have any appropriate machine learning model architecture that enables it to perform its described function. For example, the sub-model may be a neural network model, a random forest model, a support vector machine (SVM) model, a gradient boosting model, a linear model, or a combination thereof. For example, when configured as a neural network, the embedding sub-model 110A may include at least one neural network layer, e.g., at least one fully-connected layer or convolutional layer. In the case of multiple neural network layers, they may be stacked, so as to pass data successively between them in a certain layer order. As a concrete example, to generate the embedding 112C which characterizes visual attributes of the content of the network accessible page, the embedding sub-network 110C can be a convolutional sub-network, i.e., that includes one or more convolutional neural network layers, that is configured to process the image data of the network accessible page 102. On the other hand, to generate the embedding 112B which characterizes features of other lower-dimensional data, e.g., text data, of the network accessible page 102, the embedding sub-network 110B can be a fully-connected sub-network.

In some implementations, to generate the domain/page similarity score 122A, the system 100 extracts, e.g., by using a data pre-processing module of the system, network attributes information from the domain of the network accessible page 102 and provides the extracted information as input to the first embedding sub-model 110A, which then processes the input to generate the first embedding 112A of the network accessible page 102. Specifically, the network attributes information can include information about the domain name system (DNS) properties of the domain of the network accessible page, such as DNS time-to-live (TTL), scope, reach, and age of domain, to name just a few example.

In addition to network attributes, the system 100 can extract and provide as input to the first embedding sub-model 110A other relevant information, such as lexical attributes of the domain of the network accessible page 102, structural attributes of the network accessible page 102, or both. Specifically, the lexical attributes can for example include the alpha numeric properties of the domain name or subdomain name of the network accessible page, and structural attributes can for example include certificate authority, relative rank, and page rank of the network accessible page.

When the first embedding sub-network 110A receives this information, the first embedding sub-model 110A can process this information in accordance with the logics defined by its architecture and/or parameters to generate a corresponding first embedding 112A that characterizes the network attributes of the domain of the network accessible page and, in some cases, the lexical attributes of the domain of the network accessible page, and/or the structural attributes of the network accessible page. For example, generating the first embedding sub-model 110A can involve performing semantic inference on the lexical properties of the domain or subdomain name of the network accessible page. From the first embedding 112A, the domain/page similarity score 122A can be generated by using the first scoring sub-model 114A and in accordance with the logics defined by its architecture and/or parameters.

In some implementations, to generate the sensitivity score 122B, the system 100 extracts content attributes information from the network accessible page 102 and provides the extracted information as input to the second embedding sub-model 110B, which then processes the input to generate the second embedding 112B of the network accessible page 102. Specifically, the content attributes information can include any information obtained from using natural language processing techniques, such as lemmatization and vectorization, to process the network accessible page.

When the second embedding sub-network 110B receives this information, the second embedding sub-model 110B can process this information in accordance with the logics defined by its architecture and/or parameters to generate a corresponding second embedding 112B that characterizes the content attributes of the network accessible page. From the second embedding 112B, the sensitivity score 122B can be generated by using the second scoring sub-model 114B and in accordance with the logics defined by its architecture and/or parameters.

In some implementations, to generate the visual similarity score 122C, the system 100 provides the network accessible page 102 (or data derived from the network accessible page 102, such as a converted version of the page) as input to the third embedding sub-model 110C, which is configured to process the input in accordance with the logics defined by its architecture and/or parameters, such as image processing (e.g., object detection or recognition) logics, to generate a corresponding third embedding 112C that characterizes the visual or other graphical attributes of the network accessible page. From the third embedding 112C, the visual similarity score 122C can be generated by using the third scoring sub-model 114C and in accordance with the logics defined by its architecture and/or parameters.

Lastly, the system 100 uses the output module 130 to process the domain/page similarity score 122A, the sensitivity score 122B, and, in some cases, the visual similarity score 122C to generate the output classification 152. In some implementations, the output classification 152 can be a weighted combination of the three scores 122A-C. That is, output module 130 generates the output classification 152 for the network accessible page 102 by determining a weighted sum of the scores 122A-C weighted by the respective weights for the scores, which may themselves be tunable parameters of the system, or may be learned values determined through the training of the system. In some of these implementations, the weights may be adjusted dynamically based on the actual input received by the system 100, for example a weight to be assigned to the sensitivity score 122B may be set to zero in the case where the network accessible page 102 itself is not reachable by the system when computing the classification inference.

In the example of FIG. 1, the system 100 includes a total of three machine learning models, i.e., machine learning models 120A-C, each in turn includes an embedding sub-model and a scoring sub-model, e.g., embedding sub-model 110A and scoring sub-model 114A. However, there may be a different (i.e., greater or smaller) number of machine learning models, a different number of embedding or scoring sub-models, and the sub-models need not have a one-to-one correspondence with each other. Each sub-model can have any appropriate machine learning model architecture. For example, in some implementations, the system 100 may include only two machine learning models—a first one that generates the domain/page similarity score 122A and a second one that generates the sensitivity score 122B—and the system 100 uses the two scores to generate the classification output 152 of the network accessible page 102.

Figure 2:
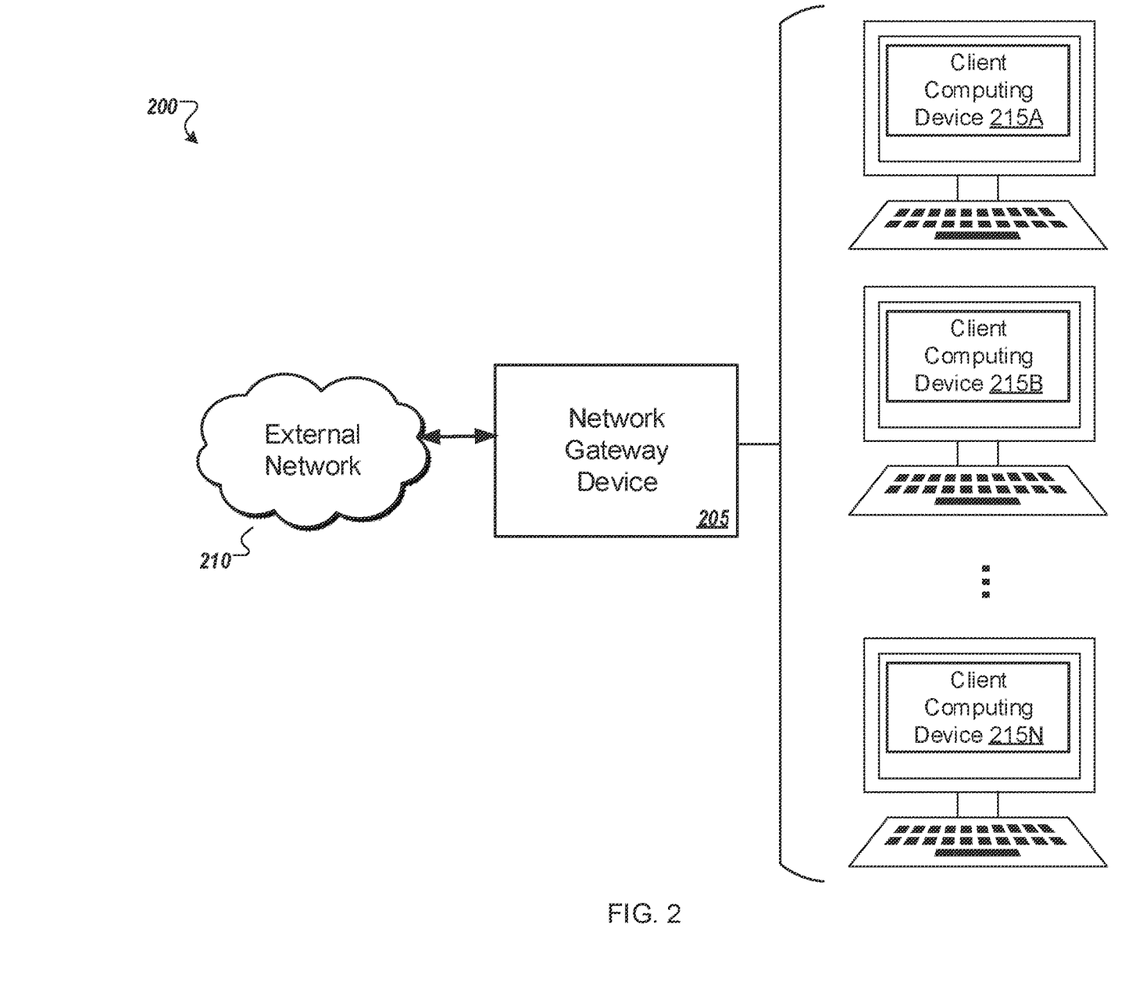
FIG. 2 is an illustration of an example environment in which a system for generating a classification determination of a network accessible page can be implemented, according to an implementation.

FIG. 2 is an illustration of an example environment 200 in which a system for generating a classification determination of a network accessible page, the system 100 of FIG. 1, can be implemented. The environment 200 includes a network gateway device 205 that provides client computing devices 215A-N access to an external network 210, such as Internet. The network gateway 205 may be implemented on one or more computer servers, on which the system 100 of FIG. 1 may be implemented. The gateway 205 can be a wireless router, a wireless access point, a modem cum router, a set-top box, a zero trust network access (ZTNA) point, or any computing device that can provide access to the external network 210. In some implementations, the gateway 205 can provide a client computing device with access to enterprise resources instead of traditional Virtual Private Networks (VPNs), namely the gateway 205 provides Zero Trust Network Access (ZTNA). ZTNA is a set of technologies that operates on an adaptive trust model, where trust is never implicit, and access is granted on a "need-to-know," least-privileged basis defined by granular policies. In some implementations, the gateway 205 can connect to a modem that connects to an Internet service provider to provide access to Internet. In some implementations, the gateway 205 is a set-top box, which is an electronic equipment that can acquire, process and distribute one or more signals transmitted by broadcast, cable, telephone, or satellite distributors in addition to providing access to the external network 210. The external network 210 can be Internet, wide area network (WAN), etc. The client computing devices 215 can be any computing device that can access the external network 210. For example, the client computing device, e.g., client computing device 215A, can be a desktop, a laptop, a tablet PC, a smartphone, a wearable computing device, an IoT device, a set-top box, a wireless router, a media streaming device, or a NAS device.

The client computing devices 215 can connect to the gateway 205 via a wireless or a wired network connection. For example, the client computing device 215A can connect to the gateway 205 wirelessly and the client computing device 215B can connect to the gateway 205 via a wired network connection, e.g., Ethernet cable. In some implementations, the gateway 205 can be a wireless router in a facility of the network owner and the client computing devices 215 can include a desktop, a laptop, a smartphone, a tablet PC, an IoT device or a NAS device associated with the network owner.

The client computing devices sometimes fall victim to phishing threats. For example, the client computing device 215A may request, e.g., by utilizing an end-user browser installed thereon, a web page from a content provider on the external network 210. This web page could in fact be a phishing web page. A phishing web page aims to convince users to reveal their personal information and/or credentials. Phishers can then use the revealed information to gain access to user accounts or to impersonate the phished user.

In this example environment, the gateway 205 that is running an embodiment of the system 100 of FIG. 1 can monitor the network traffic and detect any phishing threats, such that when the gateway 205 determines that a web page requested by a particular client computing device has been classified as phishing or suspicious, the gateway 205 can perform response actions specified by a predetermined set of instructions. Example response actions include: blocking the access to the web page by the client computing device, notifying the client computing device that submits the request, notifying an external entity such as another investigation module or an IT operational staff for further analysis of the web page, or storing a copy of the traffic (e.g., data) or summary information about the traffic in the gateway's logs.

Figure 3:
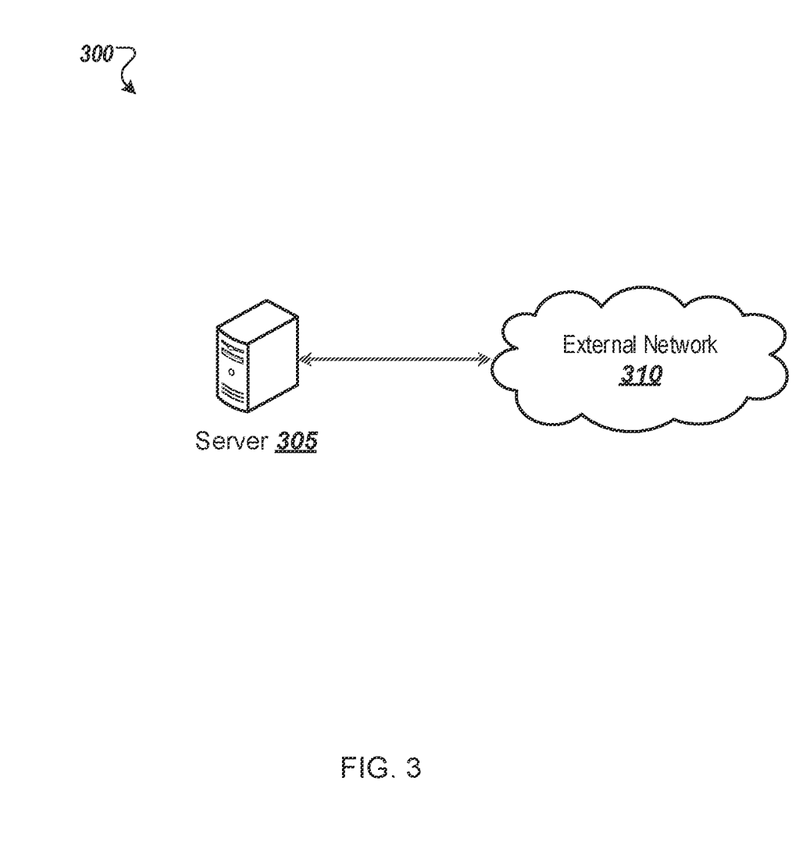
FIG. 3 is an illustration of another example environment in which a system for generating a classification determination of a network accessible page can be implemented, according to an implementation.

FIG. 3 is an illustration of another example environment 300 in which a system for generating a classification determination of a network accessible page, the system 100 of FIG. 1, can be implemented. The environment 300 includes a server 305 implemented on one or more computers in one or more locations on which the system 100 of FIG. 1 may be implemented, and is generally coupled in data communication with a an external network.

The server 305 can communicate with computers, servers, or other devices on an external network 310, such as the Internet, although types of external networks are possible. The server 300 gathers information of different web pages from various sources. The server 305 may gather the information from web domain hosting sites, web crawlers, or a combination of them, for analysis.

The server 305 actively generates classification determinations for different web pages by making use of an embodiment of the system 100. The system 100 may be used as often as necessary to obtain the most recently created web pages. For example, the system 100 may be used once an hour, once a day, or every time there is a new launch of a web page on a given web domain hosting site.

Once a web page has been classified as phishing or suspicious, the server 305 can perform response actions specified by a predetermined set of instructions. Example response actions include: submit the URL of the web page to a community-managed phish verification system, notifying the web domain hosting site that supplies underlying service to the web page, or notifying an external entity such as another investigation module or an IT operational staff for further analysis of the web page. The server 305 can do this in a variety of ways, e.g., by sending an e-mail or using an Application Programming Interface (API) made available by the external entity.

Figure 4:
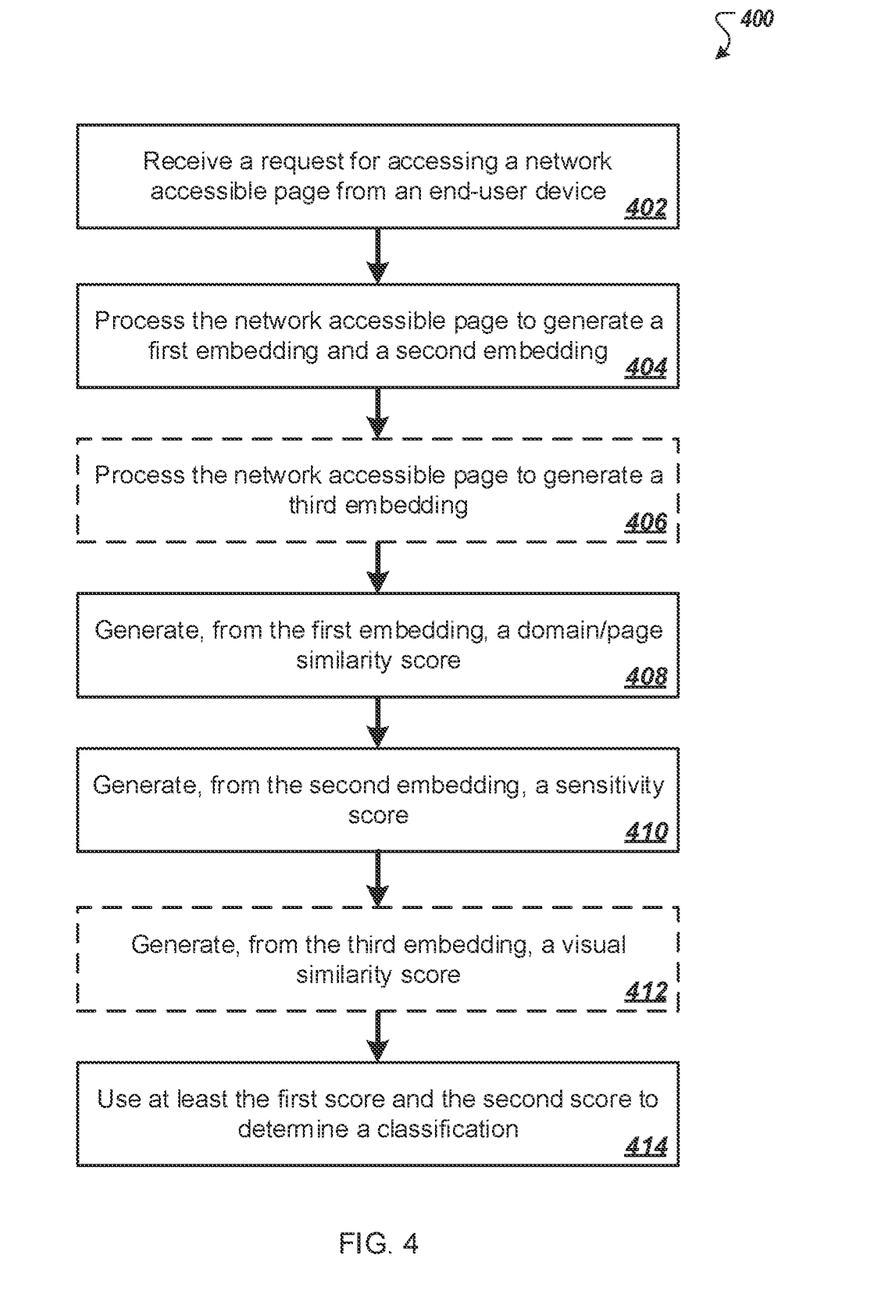
FIG. 4 is a flowchart showing an example method for generating a classification determination of a network accessible page, according to an implementation.

FIG. 4 is a flowchart showing an example process 400 for generating a classification determination of a network accessible page, according to an implementation. For convenience, the process 400 will be described as being performed by a system of one or more computers located in one or more locations. For example, a system, e.g., the system 100 of FIG. 1, appropriately programmed, can perform the process 400. The example process 400 shown in FIG. 4 may also be implemented using additional, fewer, or different operations, which can be performed in the order shown or in a different order.

The system receives a request for accessing a network accessible page (step 402). For example, the request for accessing the network accessible page can be a request from an end-user device to access a certain web page that is identified, e.g., by a fully-qualified domain name (FQDN) or a uniform resource locator (URL) of the network accessible page.

In some implementations, after retrieving the requested network accessible page the system can load the network accessible page in a sandbox (e.g., a virtual environment (VM)) and analyze what it does, or what it contains by performing the following steps within that sandbox, in the case it poses any potentially phishing threats, or performs any potentially malicious actions.

The system processes a system input that includes the network accessible page, data derived from the network accessible page, or both to generate a first embedding and a second embedding (step 404) by using a respective embedding sub-model. In some implementations, the first embedding can characterize network attributes of the domain of the network accessible page and, in some cases, lexical attributes of the domain name of the network accessible page, structural attributes of the network accessible page, or both. The second embedding can characterize content attributes of the network accessible page.

Optionally, the system also process the system input that includes the network accessible page, data derived from the network accessible page, or both to generate a third embedding that characterizes visual or other graphical attributes of the network accessible page (step 406). In some implementations, the third embedding can characterize information about visual or graphical attributes of the network accessible page.

In some implementations, the first, second, and third embeddings can be generated by using a respective machine learning model. In some of these implementations, to generate the first, second, and third embeddings, the system can provide each machine learning model with a different model input that is derived from the system input. For example, the second machine learning model can process an input that includes different features, attributes, or properties extracted from the network accessible page than those included in the input to the third machine learning model.

The system generates, from the first embedding, a first score that characterizes a predicted similarity between the network accessible page and one or more known network accessible pages (step 408). For example, the first score can characterize a predicted similarity, such as a homoglyphic similarity, between the domain name (and/or subdomain name) of the requested network accessible page and the domain name(s) (and/or subdomain name(s)) of one or more known network accessible pages. In this example, in the case where the first score satisfies a threshold, the system can sometimes additionally generate data that identifies which particular known network accessible page is considered similar to the requested network accessible page.

The system generates, from the second embedding, a second score that characterizes a predicted likelihood that the network accessible page is asking for sensitive information (step 410). For example, the second score can characterize a predicted likelihood that the requested network accessible page is a login web page.

Optionally, in the case where the system also generates the first embedding, the system generates, from the third embedding, a third score that characterizes a predicted similarity between the network accessible page and one or more known network accessible pages that ask for sensitive information (step 412). For example, the third score can characterize a predicted visual similarity between a login section of the network accessible page and a login section of a known network accessible page.

In some implementations, the first, second, and third scores can be generated by using a respective machine learning model. In some implementations, each score can be any value between 0 and 1 (e.g., inclusive on both ends).

The system use the first score, the second score and, in some cases, the third score to determine a classification of the network accessible page, the domain of the network accessible page, or both (step 414). In some implementations, the system can do this by computing a weighted combination of the first score, the second score, and the third score, and comparing the weighted combination with a threshold score, such as a neighborhood similarity score. In the case where the weighted combination is above the threshold score, the system can classify the requested network accessible page as a phishing network accessible page, or as a suspicious network accessible page. Appropriate actions may then be initiated by the system. Alternatively, in the case where the weighted combination is below the threshold score, the system can classify the requested network accessible page as a benign network accessible page.

A few example outputs that can be generated by the system after performing process 400 are shown below. In particular, the output in the first example specifies that the requested network accessible page ("https://amazom.rcyjw-.bar/") has a 91.6% possibility of being a phishing network accessible page. In this example, because the requested network accessible page is not accessible at the inference time, the system sets a weight to be assigned to the second score (which characterizes a predicted likelihood that the network accessible page is asking for sensitive information) to be zero.

---
Example 1.
---

{"url": "https://amazom.rcyjw.bar/", "isPhish": true, "isSuspicious": true, "phishProba": 0.9159642975315582, "benignProba": 0.08403570246844182, "isLogin": "", "urlAccessible": false}

In the second example, the requested network accessible page may be a zero day phishing webpage which has been live for no more than a few hours, and thus conventional phish prevention solutions such as a static block list may fail to intercept. By performing the process 400 as described above, however, the system is able to determine that it has a 94.3% possibility of being a phishing network accessible page.

---
Example 2.
---

{"url": "https://www-dofus-touch.shop/", "isPhish": true, "isSuspicious": true, "phishProba": 0.9431721156565667, "benignProba": 0.05682788434343315, "isLogin": "{'isLogin': False, 'isLoginProb': 0.49569724596491815}", "urlAccessible": true}

In general, the process 400 can be performed as part of generating a classification determination of a network accessible page for which the desired output, i.e., the classification that should be generated by the system for the network accessible page, is not known.

The process 400 can also be performed as part of processing inputs derived from a set of training data, i.e., inputs derived from a list of network accessible pages for which the classification that should be generated by the system is known, in order to train the trainable components of the system to determine trained values for the parameters of the machine learning models, so that the system can more accurately classify network accessible pages during inference. Specifically, the system can do this by optimizing an objective function that is specific to the network accessible page classification task. The exact forms of the objective function may vary, but typically, the objective function measures a difference between the predicted classification and the known, desired classification. For example, the difference may be a difference evaluated using a cross-entropy loss function.

The system can repeatedly perform the process 400 on inputs selected from a set of training data as part of a conventional machine learning training technique to train the machine learning models, e.g., a gradient descent with backpropagation training technique that uses a conventional optimizer, e.g., stochastic gradient descent, RMSprop, or Adam optimizer, including Adam with weight decay ("AdamW") optimizer.

Described implementations of the subject matter can include one or more features, alone or in combination.

For example, in a first implementation, a method, comprising: receiving, at a gateway, a request for accessing a network accessible page from an end-user device; processing the network accessible page to generate a first embedding that characterizes network attributes of a domain of the network accessible page, and a second embedding that characterizes content attributes of the network accessible page; generating, from the first embedding, a first score that characterizes a predicted similarity between the network accessible page and one or more known network accessible pages; generating, from the second embedding, a second score that characterizes a predicted likelihood that the network accessible page is asking for sensitive information; and using at least the first score and the second score to determine a classification of the network accessible page, the domain of the network accessible page, or both.

The foregoing and other described implementations can each, optionally, include one or more of the following features:

A first feature, combinable with any of the following features, further comprising processing the network accessible page to generate a third embedding that characterizes visual attributes of the network accessible page; and generating, from the third embedding, a third score that characterizes a predicted similarity between the network accessible page and one or more known network accessible pages that ask for sensitive information.

A second feature, combinable with any of the following features, further comprising using the first score, the second score, and the third score to determine the classification of the network accessible page.

A third feature, combinable with any of the following features, wherein receiving the request for accessing the network accessible page comprises receiving a fully-qualified domain name (FQDN) or a uniform resource locator (URL) of the network accessible page A fourth feature, combinable with any of the following features, wherein processing the network accessible page comprises loading the network accessible page in a sandbox environment.

A fifth feature, combinable with any of the following features, wherein the first embedding further characterizes one or more of lexical attributes of the domain of the network accessible page, or structural attributes of the network accessible page.

A sixth feature, combinable with any of the following features, wherein the second embedding is generated based on using natural language processing techniques to process the network accessible page, data derived from the network accessible page, or both.

A seventh feature, combinable with any of the following features, wherein the first score, the second score, and the third score are generated by using a respective machine learning model.

A eighth feature, combinable with any of the following features, wherein using the first score, the second score, and the third score to determine the classification of the network accessible page comprises: computing a weighted combination of the first score, the second score, and the third score; and comparing the weighted combination with a neighborhood similarity score.

A ninth feature, combinable with any of the following features, wherein the classification specifies whether the network accessible page is a phishing network accessible page, or whether the network accessible page is a suspicious network accessible page.

A tenth feature, combinable with any of the following features, wherein the phishing network accessible page comprises a zero day phishing webpage.

A eleventh feature, combinable with any of the following features, further comprising performing, by the gateway, a block action on accessing the network accessible page by the end-user device.

A twelfth feature, combinable with any of the following features, further comprising notifying, by the gateway, an operational staff for further analysis of the network accessible page.

A thirteenth feature, combinable with any of the following features, wherein the sensitive information comprises user credentials or personal identifiable information.

In a second implementation, a computer-readable medium containing instructions which, when executed, cause a computing device to perform operations comprising: receiving, at the network gateway device, a request for accessing a network accessible page from an end-user device; processing the network accessible page to generate a first embedding that characterizes network attributes of a domain of the network accessible page, and a second embedding that characterizes content attributes of the network accessible page; generating, from the first embedding, a first score that characterizes a predicted similarity between the network accessible page and one or more known network accessible pages; generating, from the second embedding, a second score that characterizes a predicted likelihood that the network accessible page is asking for sensitive information; and using at least the first score and the second score to determine a classification of the network accessible page, the domain of the network accessible page, or both.

The foregoing and other described implementations can each, optionally, include one or more of the following features:

A first feature, combinable with any of the following features, wherein the operations further comprise: processing the network accessible page to generate a third embedding that characterizes visual attributes of the network accessible page; and generating, from the third embedding, a third score that characterizes a predicted similarity between the network accessible page and one or more known network accessible pages that ask for sensitive information.

A second feature, combinable with any of the following features, wherein the operations further comprise: using the first score, the second score, and the third score to determine the classification of the network accessible page.

A third feature, combinable with any of the following features, wherein receiving the request for accessing the network accessible page comprises receiving a fully-qualified domain name (FQDN) or a uniform resource locator (URL) of the network accessible page A fourth feature, combinable with any of the following features, wherein processing the network accessible page comprises loading the network accessible page in a sandbox environment.

A fifth feature, combinable with any of the following features, wherein the first embedding further characterizes one or more of lexical attributes of the domain of the network accessible page, or structural attributes of the network accessible page.

A sixth feature, combinable with any of the following features, wherein the second embedding is generated based on using natural language processing techniques to process the network accessible page, data derived from the network accessible page, or both.

A seventh feature, combinable with any of the following features, wherein the first score, the second score, and the third score are generated by using a respective machine learning model.

A eighth feature, combinable with any of the following features, wherein using the first score, the second score, and the third score to determine the classification of the network accessible page comprises: computing a weighted combination of the first score, the second score, and the third score; and comparing the weighted combination with a neighborhood similarity score.

A ninth feature, combinable with any of the following features, wherein the classification specifies whether the network accessible page is a phishing network accessible page, or whether the network accessible page is a suspicious network accessible page.

A tenth feature, combinable with any of the following features, wherein the phishing network accessible page comprises a zero day phishing webpage.

A eleventh feature, combinable with any of the following features, wherein the operations further comprise: performing, by the gateway, a block action on accessing the network accessible page by the end-user device.

A twelfth feature, combinable with any of the following features, wherein the operations further comprise: notifying, by the gateway, an operational staff for further analysis of the network accessible page.

A thirteenth feature, combinable with any of the following features, wherein the sensitive information comprises user credentials or personal identifiable information.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, at the network gateway device, a request for accessing a network accessible page from an end-user device; processing the network accessible page to generate a first embedding that characterizes network attributes of a domain of the network accessible page, and a second embedding that characterizes content attributes of the network accessible page; generating, from the first embedding, a first score that characterizes a predicted similarity between the network accessible page and one or more known network accessible pages; generating, from the second embedding, a second score that characterizes a predicted likelihood that the network accessible page is asking for sensitive information; and using at least the first score and the second score to determine a classification of the network accessible page, the domain of the network accessible page, or both.

The foregoing and other described implementations can each, optionally, include one or more of the following features:

A first feature, combinable with any of the following features, wherein the operations further comprise: processing the network accessible page to generate a third embedding that characterizes visual attributes of the network accessible page; and generating, from the third embedding, a third score that characterizes a predicted similarity between the network accessible page and one or more known network accessible pages that ask for sensitive information.

A second feature, combinable with any of the following features, wherein the operations further comprise: using the first score, the second score, and the third score to determine the classification of the network accessible page.

A third feature, combinable with any of the following features, wherein receiving the request for accessing the network accessible page comprises receiving a fully-qualified domain name (FQDN) or a uniform resource locator (URL) of the network accessible page A fourth feature, combinable with any of the following features, wherein processing the network accessible page comprises loading the network accessible page in a sandbox environment.

A fifth feature, combinable with any of the following features, wherein the first embedding further characterizes one or more of lexical attributes of the domain of the network accessible page, or structural attributes of the network accessible page.

A sixth feature, combinable with any of the following features, wherein the second embedding is generated based on using natural language processing techniques to process the network accessible page, data derived from the network accessible page, or both.

A seventh feature, combinable with any of the following features, wherein the first score, the second score, and the third score are generated by using a respective machine learning model.

A eighth feature, combinable with any of the following features, wherein using the first score, the second score, and the third score to determine the classification of the network accessible page comprises: computing a weighted combination of the first score, the second score, and the third score; and comparing the weighted combination with a neighborhood similarity score.

A ninth feature, combinable with any of the following features, wherein the classification specifies whether the network accessible page is a phishing network accessible page, or whether the network accessible page is a suspicious network accessible page.

A tenth feature, combinable with any of the following features, wherein the phishing network accessible page comprises a zero day phishing webpage.

A eleventh feature, combinable with any of the following features, wherein the operations further comprise: performing, by the gateway, a block action on accessing the network accessible page by the end-user device.

A twelfth feature, combinable with any of the following features, wherein the operations further comprise: notifying, by the gateway, an operational staff for further analysis of the network accessible page.

A thirteenth feature, combinable with any of the following features, wherein the sensitive information comprises user credentials or personal identifiable information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method, comprising:
receiving, at a gateway, a request for accessing a network accessible page from an end-user device;
processing the network accessible page using a first embedding sub-model included in a domain/page similarity machine learning model to generate a first embedding that characterizes network attributes of a domain of the network accessible page;
processing the network accessible page using a second embedding sub-model included in a sensitivity machine learning model to generate a second embedding that characterizes content attributes of the network accessible page;
processing the first embedding using a first scoring sub-model included in the domain/page similarity machine learning model to generate a domain/page similarity score that characterizes a predicted similarity between the network accessible page and one or more known network accessible pages;
processing the second embedding using a second scoring sub-model included in the sensitivity machine learning model to generate a sensitivity score that characterizes a predicted likelihood that the network accessible page is a data gathering page that is requesting sensitive information input from a user; and
using at least the domain/page similarity score and the sensitivity score to determine a classification of (i) the network accessible page, (ii) the domain of the network accessible page, or both (i) and (ii).

2. The method of claim 1, further comprising:
processing the network accessible page using a third embedding sub-model included in a visual similarity machine learning model to generate a third embedding that characterizes visual attributes of the network accessible page; and
processing the third embedding using a third scoring sub-model included in the visual similarity machine learning model to generate a visual similarity score that characterizes a predicted similarity between the network accessible page and one or more known network accessible pages that is requesting sensitive information.

3. The method of claim 2, further comprising using the domain/page similarity score, the sensitivity score, and the visual similarity score to determine the classification of the network accessible page.

4. The method of claim 1, wherein receiving the request for accessing the network accessible page comprises receiving a fully-qualified domain name (FQDN) or a uniform resource locator (URL) of the network accessible page.

5. The method of claim 1, wherein processing the network accessible page comprises loading the network accessible page in a sandbox environment.

6. The method of claim 1, wherein the first embedding further characterizes one or more of lexical attributes of the domain of the network accessible page, or structural attributes of the network accessible page.

7. The method of claim 1, wherein the second embedding sub-model included in the sensitivity machine learning model is configured to apply natural language processing techniques to the network accessible page, data derived from the network accessible page, or both.

8. The method of claim 3, wherein using the domain/page similarity score, the sensitivity score, and the visual similarity score to determine the classification of the network accessible page comprises:

computing a weighted combination of the domain/page similarity score, the sensitivity score, and the visual similarity score; and comparing the weighted combination with a neighborhood similarity score.

9. The method of claim 1, wherein the classification specifies whether the network accessible page is a phishing network accessible page, or whether the network accessible page is a suspicious network accessible page.

10. The method of claim 9, wherein the phishing network accessible page comprises a zero day phishing webpage.

11. The method of claim 1, further comprising performing, by the gateway, a block action on accessing the network accessible page by the end-user device.

12. The method of claim 1, further comprising notifying, by the gateway, an operational staff for further analysis of the network accessible page.

13. The method of claim 1, wherein the sensitive information comprises user credentials or personal identifiable information.

14. A computer-implemented system comprising a network gateway device, wherein the network gateway device comprises:
one or more computers; and
one or more computer memory devices interoperably coupled with the one or more computers and having machine-readable media storing one or more instructions that, when executed by the one or more computers, perform one or more operations comprising:
receiving, at the network gateway device, a request for accessing a network accessible page from an end-user device;
processing the network accessible page using a first embedding sub-model included in a domain/page similarity machine learning model to generate a first embedding that characterizes network attributes of a domain of the network accessible page;
processing the network accessible page using a second embedding sub-model included in a sensitivity machine learning model to generate a second embedding that characterizes content attributes of the network accessible page;
processing the first embedding using a first scoring sub-model included in the domain/page similarity machine learning model to generate a domain/page similarity score that characterizes a predicted similarity between the network accessible page and one or more known network accessible pages;
processing the second embedding using a second scoring sub-model included in the sensitivity machine learning model to generate a sensitivity score that characterizes a predicted likelihood that the network accessible page is a data gathering page that is requesting sensitive information input from a user; and
using at least the domain/page similarity score and the sensitivity score to determine a classification of (i) the network accessible page, (ii) the domain of the network accessible page, or both (i) and (ii).

15. The system of claim 14, wherein the operations further comprise:
processing the network accessible page using a third embedding sub-model included in a visual similarity machine learning model to generate a third embedding that characterizes visual attributes of the network accessible page; and
processing the third embedding using a third scoring sub-model included in the visual similarity machine learning model to generate a visual similarity score that characterizes a predicted similarity between the network accessible page and one or more known network accessible pages that is requesting sensitive information.

16. The system of claim 15, wherein the operations further comprise using the domain/page similarity score, the sensitivity score, and the visual similarity score to determine the classification of the network accessible page.

17. The system of claim 14, wherein the first embedding further characterizes one or more of lexical attributes of the domain of the network accessible page, or structural attributes of the network accessible page.

18. The system of claim 14, wherein the second embedding sub-model included in the sensitivity machine learning model is configured to apply natural language processing techniques to the network accessible page, data derived from the network accessible page, or both.

19. A computer-readable medium containing instructions which, when executed, cause a network gateway device to perform operations comprising:
receiving, at the network gateway device, a request for accessing a network accessible page from an end-user device;
processing the network accessible page using a first embedding sub-model included in a domain/page similarity machine learning model to generate a first embedding that characterizes network attributes of a domain of the network accessible page;
processing the network accessible page using a second embedding sub-model included in a sensitivity machine learning model to generate a second embedding that characterizes content attributes of the network accessible page;
processing the first embedding using a first scoring sub-model included in the domain/page similarity machine learning model to generate a domain/page similarity score that characterizes a predicted similarity between the network accessible page and one or more known network accessible pages;
processing the second embedding using a second scoring sub-model included in the sensitivity machine learning model to generate a sensitivity score that characterizes a predicted likelihood that the network accessible page is a data gathering page that is requesting sensitive information input from a user; and
using at least the domain/page similarity score and the sensitivity score to determine a classification of (i) the network accessible page, (ii) the domain of the network accessible page, or both (i) and (ii).

20. The method of claim 1, wherein the predicted similarity comprises a homoglyphic similarity.

21. The method of claim 20, wherein the homoglyphic similarity comprises a homoglyphic similarity between (i) a domain name, a subdomain name, or both of the network accessible page and (ii) a domain name, a subdomain name, or both of each of the one or more known network accessible pages.

* * * * *